United States Patent
Gansley et al.

(10) Patent No.: US 9,861,930 B2
(45) Date of Patent: *Jan. 9, 2018

(54) APPARATUS AND METHOD FOR EVAPORATING WASTE WATER AND REDUCING ACID GAS EMISSIONS

(71) Applicant: General Electric Technology GmbH, Baden (CH)

(72) Inventors: Raymond Raulfs Gansley, Knoxville, TN (US); Philip C. Rader, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,986

(22) Filed: Apr. 29, 2016

(65) Prior Publication Data

US 2016/0243493 A1    Aug. 25, 2016

Related U.S. Application Data

(63) Continuation of application No. 14/146,424, filed on Jan. 2, 2014, now Pat. No. 9,352,274.

(51) Int. Cl.
*B01D 53/50* (2006.01)
*B01D 53/75* (2006.01)
(Continued)

(52) U.S. Cl.
CPC ......... *B01D 53/1456* (2013.01); *B01D 53/40* (2013.01); *C02F 1/048* (2013.01);
(Continued)

(58) Field of Classification Search
CPC .... B01D 53/50; B01D 53/501; B01D 53/504; B01D 53/505; B01D 53/75; B01D 53/77;
(Continued)

(56) References Cited

U.S. PATENT DOCUMENTS 3,926,129 A    12/1975   Wall
4,322,393 A    3/1982    Gleason et al.
(Continued)

FOREIGN PATENT DOCUMENTS

CN    1478585 A    3/2004
CN    204298090 U    4/2015
(Continued)

OTHER PUBLICATIONS

Gansley et al., U.S. Appl. No. 15/142,205, filed Apr. 29, 2016.
U.S. Notice of Allowance issued in connection with Related U.S. Appl. No. 15/142,205 dated May 16, 2017.

*Primary Examiner* — Timothy C Vanoy
(74) *Attorney, Agent, or Firm* — GE Global Patent Operation; Rita D. Vacca

(57) ABSTRACT

An apparatus for evaporating waste water and reducing gas emissions includes an evaporator device configured to receiving a portion of flue gas emitted from a boiler unit and waste water to directly contact the flue gas with the waste water to cool and humidify the flue gas and to dry solid particulates within the waste water. In some embodiments, the waste water may be a component of a mixture formed by a mixer device prior to being contacted with the flue gas to humidify and cool the flue gas and dry solids within the waste water. An alkaline reagent as well as activated carbon can be mixed with the waste water prior to the waste water contacting the flue gas. Solid particulates that are dried within the cooled and humidified flue gas can be separated from the flue gas via a particulate collector.

14 Claims, 2 Drawing Sheets

(51) Int. Cl.

| | | |
|---|---|---|
| *B01D 53/78* | (2006.01) | |
| *B01D 53/14* | (2006.01) | |
| *B01D 53/40* | (2006.01) | |
| *F23J 15/04* | (2006.01) | |
| *C02F 9/00* | (2006.01) | |
| *F23J 15/00* | (2006.01) | |
| *C02F 1/04* | (2006.01) | |
| *C02F 1/10* | (2006.01) | |
| *C02F 1/28* | (2006.01) | |
| *C02F 1/66* | (2006.01) | |

(52) U.S. Cl.
CPC .................. *C02F 1/10* (2013.01); *C02F 9/00* (2013.01); *F23J 15/003* (2013.01); *F23J 15/04* (2013.01); *B01D 2252/60* (2013.01); *C02F 1/04* (2013.01); *C02F 1/283* (2013.01); *C02F 1/66* (2013.01); *C02F 2305/12* (2013.01); *F23J 2215/20* (2013.01); *F23J 2217/00* (2013.01); *F23J 2217/102* (2013.01); *F23J 2219/40* (2013.01)

(58) Field of Classification Search
CPC .............. B01D 53/78; B01D 2257/302; B01D 2258/0283
See application file for complete search history.

(56) References Cited

U.S. PATENT DOCUMENTS

| | | | |
|---|---|---|---|
| 4,620,856 A | 11/1986 | Rosenberg et al. | |
| 5,814,288 A | 9/1998 | Madden et al. | |
| 5,928,412 A | 7/1999 | Bastholm et al. | |
| 6,076,369 A | 6/2000 | Ochi et al. | |
| 7,524,470 B2 | 4/2009 | Barger et al. | |
| 7,625,537 B2 | 12/2009 | Rader et al. | |
| 7,766,997 B2 | 8/2010 | Lindau | |
| 8,052,763 B2 | 11/2011 | Gallot | |
| 8,268,276 B2 | 9/2012 | Pearson | |
| 8,388,917 B2 | 3/2013 | Ukai et al. | |
| 8,475,750 B2 | 7/2013 | Ukai et al. | |
| 8,475,850 B2 | 7/2013 | Tripp et al. | |
| 8,585,869 B1 | 11/2013 | Duesel, Jr. et al. | |
| 8,628,603 B2 | 1/2014 | Martin et al. | |
| 8,715,402 B2 | 5/2014 | Ukai et al. | |
| 8,877,066 B2 | 11/2014 | Cenci et al. | |
| 8,883,107 B2 * | 11/2014 | Ukai | B01D 1/14 423/243.08 |
| 8,961,916 B1 | 2/2015 | Bader | |
| 8,986,428 B2 | 3/2015 | Ukai et al. | |
| 9,352,274 B2 * | 5/2016 | Rader | B01D 53/40 |
| 2001/0008620 A1 | 7/2001 | Dohmann et al. | |
| 2009/0294377 A1 | 12/2009 | Gallot | |
| 2011/0262331 A1 | 10/2011 | Ukai et al. | |
| 2012/0240761 A1 | 9/2012 | Ukai et al. | |
| 2012/0285353 A1 | 11/2012 | Kumar | |
| 2013/0220792 A1 | 8/2013 | Ungerer et al. | |
| 2013/0248121 A1 * | 9/2013 | Ukai | B01D 53/504 159/4.02 |
| 2014/0045131 A1 * | 2/2014 | Fukuda | C02F 1/048 432/72 |
| 2014/0202362 A1 * | 7/2014 | Ukai | B01D 1/14 110/215 |
| 2015/0157974 A1 * | 6/2015 | Ukai | B01D 1/14 96/173 |
| 2016/0185619 A1 * | 6/2016 | Ukai | B01D 53/501 210/652 |
| 2016/0243498 A1 * | 8/2016 | Kamiyama | F23J 15/003 |

FOREIGN PATENT DOCUMENTS

| | | |
|---|---|---|
| CN | 104671221 A | 6/2015 |
| CN | 104402159 B | 1/2016 |
| DE | 4124844 A1 | 1/1993 |
| DE | 4339072 | 5/1995 |
| DE | 4404284 A1 | 8/1995 |
| EP | 1 955 755 A2 | 8/2008 |
| JP | S9132921 A | 7/1984 |
| JP | S61-181519 A | 8/1986 |
| JP | 102817/87 | 5/1987 |
| JP | S63200818 | 8/1988 |
| JP | 63-063248 B | 12/1988 |
| JP | 198613/90 | 8/1990 |
| JP | H07-110109 A | 4/1995 |
| JP | 294912/97 | 11/1997 |
| JP | 2012-057037 A | 3/2012 |
| JP | 2012-057389 A | 3/2012 |
| JP | 2012-515638 A | 7/2012 |
| JP | 2012-196638 A | 10/2012 |
| JP | 2012200721 A | 10/2012 |
| WO | 2006/030398 A1 | 3/2006 |

* cited by examiner

APPARATUS AND METHOD FOR EVAPORATING WASTE WATER AND REDUCING ACID GAS EMISSIONS

CROSS-REFERENCE TO RELATED APPLICATIONS

This is a continuation application claiming priority to pending application Ser. No. 14/146,424 having a filing date of Jan. 2, 2014, entitled "APPARATUS AND METHOD FOR EVAPORATING WASTE WATER AND REDUCING ACID GAS EMISSIONS" incorporated herein in its entirety by reference.

TECHNICAL FIELD

The present disclosure relates to an apparatus and method for using flue gas from a boiler or other combustion unit to evaporate waste water and reducing gas emissions.

BACKGROUND

Utility and industrial plants such as power plants, electricity generation plants, waste-to-energy facilities, cement kilns, and other facilities firing fossil fuels can be subject to strict limits with respect to air emissions and waste water discharge to help ensure clean and environmentally sound power generation. Traditionally, compliance with air emissions limits is achieved through the use of a wet or dry flue gas desulfurization system. Water treatment systems can be utilized to treat waste water discharge to comply with applicable waste water regulations. Examples of flue gas cleaning systems and/or waste water treatment systems can be appreciated from International Publication No. WO 2006030398, U.S. Patent Application Publication Nos. 2009/0294377, 2011/0262331, 2012/0240761, 2013/0248121, and 2013/0220792, U.S. Pat. Nos. 6,076,369, 7,524,470, 7,625,537, 8,388,917, and 8,475,750, European Patent Publication No. EP 1 955 755, and Japanese Published Patent Application No. JP 2012200721.

The capital costs of air emissions systems utilizing a wet or dry flue gas desulfurization system and the associated balance of plant systems (e.g. ducts, fans, bulk material handling systems, etc.) can often be relatively expensive (e.g. between $200-500 per kilowatt (kW)). In retrofit situations, the capital costs associated with such systems may render a plant uneconomical. In addition to the capital costs, the wet and dry flue gas desulfurization systems also involve substantial operating costs associated with reagent consumption, auxiliary power usage, and operations and management staffing.

Waste water treatment systems can be configured to neutralize and precipitate heavy metals, perform biological treatment of the waste water, and also filter the waste water to clean the water for outputting the water. Costs associated with operation of waste water treatment systems can be relatively significant in terms of capital costs and operating costs.

SUMMARY

According to aspects illustrated herein, there is provided a method for evaporating waste water and reducing acid gas emissions comprising at least the steps of contacting flue gas with waste water to cool and humidify the flue gas and dry solid particulates within the waste water, and separating the solid particulates from the cooled and humidified flue gas.

According to other aspects illustrated herein, an apparatus for evaporating waste water and reducing acid gas emissions comprises an evaporator device configured for receiving at least a first portion of flue gas emitted from a boiler unit, an alkaline reagent, solid particulates, and waste water to directly contact the flue gas with the waste water to cool and humidify the flue gas and to dry the solid particulates.

According to other aspects illustrated herein a plant, comprises a combustion unit configured to combust fuel to emit at least one of steam and flue gas, a source of an alkaline reagent, a source of liquid waste water, a particulate collector configured to separate solid material from the flue gas, and a mixer device connected to the source of liquid waste water, the source of the alkaline reagent, and the particulate collector to receive the liquid waste water, the alkaline reagent, and at least a portion of the solid material separated by the particulate collector. The mixer device can be configured to mix the liquid waste water, the alkaline reagent, and the portion of the solid material to form a mixture. The plant can also include a conduit or vessel connected to the combustion unit and the mixer device to receive the mixture from the mixer device and at least a first portion of the flue gas from the combustion unit. The conduit or vessel can be configured for directly contacting the mixture with the flue gas for a pre-specified time period to cool and humidify the flue gas and to dry solid particulates within the mixture prior to the flue gas and the solid material being fed to the particulate collector.

The above described and other features are exemplified by the following figures and detailed description.

BRIEF DESCRIPTION OF THE DRAWINGS

Referring now to the figures, which are exemplary embodiments, and wherein the like elements are numbered alike.

Other details, objects, and advantages of embodiments of the innovations disclosed herein will become apparent from the following description of exemplary embodiments and associated exemplary methods.

DETAILED DESCRIPTION

Disclosed herein is a power or industrial plant, an apparatus for evaporating waste water to reduce acid gas emissions, and a method of practicing the same that can be configured to reduce emissions such as air pollution and also reduce waste water discharge. Embodiments of the apparatus for evaporating waste water to reduce acid gas emissions can be utilizable in power plants, utility plants, and industrial plants.

Figure 1:
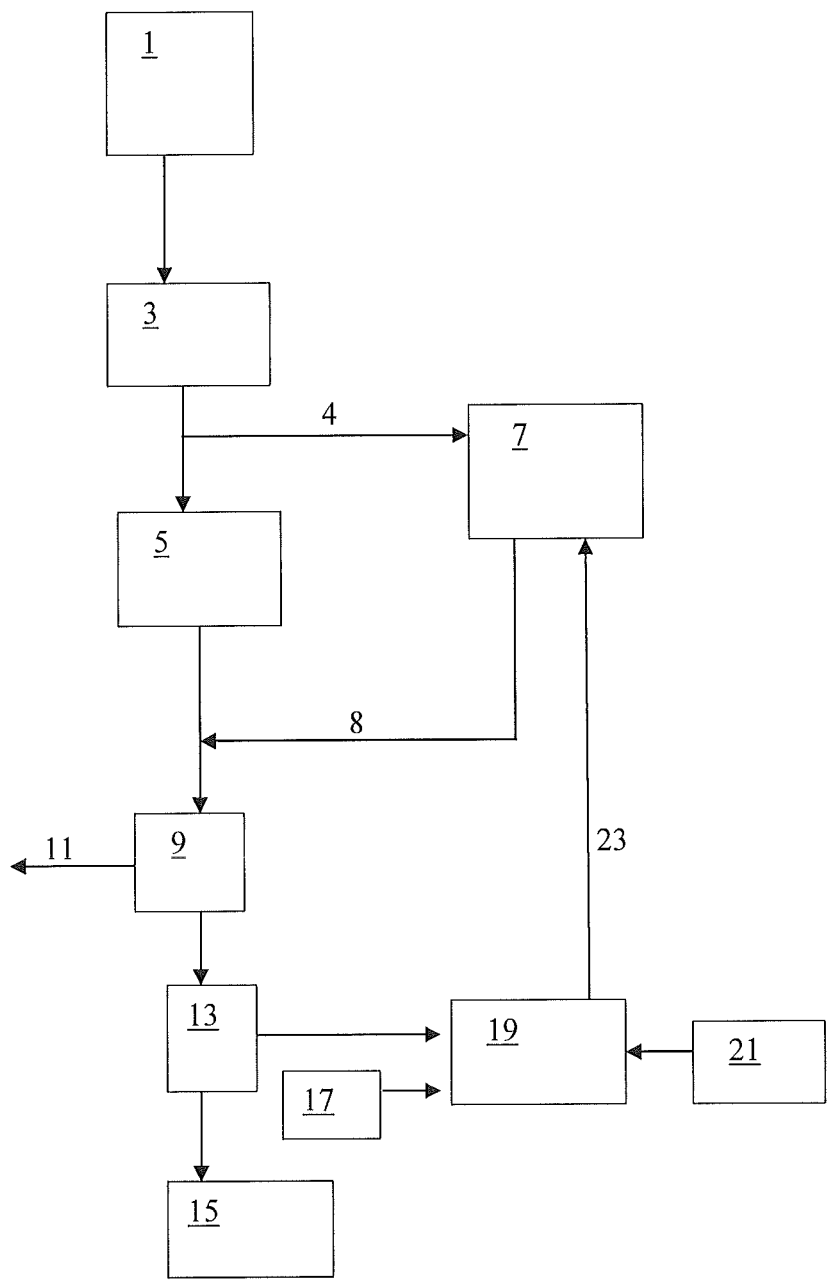
FIG. 1 is a block diagram of a first exemplary embodiment of an apparatus for evaporating waste water and reducing acid gas emissions.

Referring to FIG. 1, a power plant or an industrial plant can include a combustion unit that combusts a fuel to emit steam and/or a flue gas, such as a gas turbine or a boiler unit 1. The boiler unit 1 can be fed at least one oxygen containing gas flow (e.g. an oxidant flow such as air, $O_2$ gas, or another type of gas containing $O_2$ gas) and a fuel to combust the fuel. The fuel can be a fossil fuel such as coal, oil, or natural gas. In addition to steam, flue gas can be formed via combustion of the fuel and emitted by the boiler unit 1. The steam can be transported to a turbine (not shown) for use in generating electricity or put to other uses (e.g. district heating, process heating, etc.). The flue gas can be transported to other elements for use of the heat of the flue gas prior to emitting at least a portion of the flue gas to the atmosphere.

One or more conduits can connect the boiler unit 1 to a nitrogen oxide removing unit 3 so that the flue gas can be passed from the boiler unit 1 to the nitrogen oxide removing unit 3. The nitrogen oxide removing unit 3 can be configured as a selective catalytic reduction (SCR) unit, a selective non-catalytic reduction (SNCR) unit, or another type of element configured to remove nitrogen oxides (e.g. $NO_2$, $NO_3$, $NO_x$) from the flue gas.

After being passed through the nitrogen oxide removing unit 3, the flue gas can be split into multiple streams for further processing or use. For instance, a first portion of the flue gas can be passed through a bypass conduit 4 for bypassing a pre-heater 5 and feeding the flue gas to an evaporator device 7. The first portion of the flue gas can be considered a "slipstream" in some embodiments of the apparatus. A second portion of the flue gas can be passed through the pre-heater 5 via at least one conduit connecting the nitrogen oxide removing unit 3 to the pre-heater 5 to heat fluid flows prior to that fluid being fed to the boiler unit 1 for combusting the fuel. The second portion of the flue gas can pass through the pre-heater 5 prior to being fed to a particulate collector 9.

The evaporator device 7 can be a vessel sized to receive the flue gas and liquid waste water from a waste water vessel 19. At least one waste water conduit 23 can connect the evaporator device 7 to the waste water vessel 19 for receiving the liquid waste water. The waste water vessel 19 can be a waste water holding tank or other vessel that is configured to receive liquid waste water from one or more elements of a plant and retain that waste water for supplying the waste water to the evaporator device 7 at a pre-specified flow rate or controlled flow rate.

The evaporator device 7 can be configured as a spray dryer absorber (SDA) or other device or vessel capable of directly contacting a waste water stream with flue gas in such a way as to cool the flue gas to a reduced temperature and increase the humidity level of the flue gas by evaporating the waste water. The evaporator device 7 can include a rotary atomizer, a dual fluid nozzle, or other dispersion element to spray or otherwise disperse the liquid waste water into the flue gas for cooling and humidifying the flue gas and evaporating the waste water.

The diversion of a portion of flue gas emitted by the boiler unit 1 prior to that flue gas being fed to a pre-heater 5 for feeding to the evaporator device 7 can permit relatively hot flue gases (e.g. flue gas having a temperature of 700° F., 370° C., between 600° F. and 800° F., or between 300° C. and 450° C.) to be fed to the evaporator device. The above temperature range is representative of a steam producing power plant application, and other industrial or gas fired applications may have different temperature ranges. The use of such hot flue gas can permit the flue gas transported to the evaporator device 7 to evaporate a larger amount of waste water as compared to cooler flue gas that has previously been used in other heat transfer operations (e.g. after the flue gas has passed through a pre-heater 5). The higher flue gas temperature available by diverting the flue gas prior to entering the pre-heater 5 can permit the evaporator device 7 to be fabricated at a lower cost as the size of the evaporator device 7 may not need to accommodate larger volumes of flue gas to evaporate a desired amount of waste water as compared to other embodiments that may be configured to utilize cooler flue gas. In addition to cost savings, the use of a smaller evaporator device 7 can permit the evaporator device 7, bypass conduit 4, and output conduit 8 to utilize a smaller footprint that can be advantageous for retrofitting embodiments of the apparatus within power plants or industrial plants that may have relatively low space availability.

Use of the hot flue gas taken from upstream of the pre-heater 5 has an additional advantage in that the flue gas pressure at this location is higher than the flue gas pressure after the pre-heater. The higher pressure can facilitate a natural circulation of the flue gas passed through the bypass conduit 4 for feeding to the evaporator device 7 and outputting to the output conduit 8 so that a pump or fan is not needed for driving the flow of the flue gas to or from the evaporator device. Of course, a pump or fan may still be utilized as a back-up measure or to ensure control of flue gas flow rate is maintainable within a desired flow rate range. When a pump or fan is used in such embodiments, the pump or fan may be able to operate at lower power levels due to the larger pressure drop provided by use of the hotter flue gas.

The flow rate of flue gas entering the evaporator device 7, the temperature of the flue gas, and/or the humidity of the flue gas exiting the evaporator device 7 can be monitored via at least one flow sensor adjacent to the inlet of the evaporator device 7, at least one temperature sensor, and/or at least one humidity sensor positioned adjacent the outlet of the evaporator device 7 or positioned within the output conduit 8 of the evaporator device 7 to control operations of the evaporator device to ensure that the flue gas is cooled to at least a pre-specified temperature and has a pre-specified level of humidity. The flow rate of flue gas passing into the bypass conduit 4 and/or waste water fed to the evaporator device 7 can be adjusted based upon the flow rate, temperature, and humidity level of the flue gas detected by the one or more sensors. Alternatively, the flue gas flow rate can be maintained while the waste water flow is controlled to achieve the desired temperature and humidity conditions of the flue gas.

For example, the flue gas can be monitored to maintain the flue gas within the output conduit 8 at a pre-specified temperature range such as at a temperature of between 180° F. and 300° F. or at a temperature of between 80° C. and 150° C. As another example, the temperature of the flue gas within the evaporator device 7 and/or within the output conduit 8 can be monitored to ensure that the flue gas is at least 10° C. or 30° F. above its adiabatic saturation temperature to avoid wetting of the solid particulates and/or corrosion. In the event the flue gas is determined to be below a pre-specified temperature threshold, a larger amount of flue gas may be diverted into the bypass conduit 4 for feeding to the evaporator device 7 and/or the amount of waste water being fed to the evaporator device may be decreased so that less waste water is contacted with the flue gas. In the event the flue gas is determined to be above a pre-specified temperature threshold, more waste water may be fed to the evaporator device 7 and/or less flue gas may be transported through the bypass conduit 4 to the evaporator device.

The liquid waste water fed to the evaporator device 7 can include solid material such as solid particulates that are suspended within the waste water. The waste water can also include elements within the water that can precipitate out of the water as the liquid waste water is heated and subsequently evaporated in the evaporator device 7. When solids are present within the waste water, the solids can improve drying operations.

In an exemplary embodiment that can be preferred for at least some applications, solid material is added to the waste water to facilitate evaporation of the waste water and drying of dissolved and suspended solids thus avoiding deposition of moist particles in downstream conduits and vessels. For instance, solid particulates from the particulate collector 9 or a solid byproduct from a flue gas desulfurization system can be fed to the waste water or mixed with the waste water to add solid particulates to the waste water. The mixing of the solid particulates within the waste water may occur in a waste water vessel 19, such as a holding tank, prior to the waste water being fed to the evaporator device.

The liquid waste water can also include other elements that are mixed or added therein. For example, a material containing an alkaline reagent such as lime, hydrated lime, sodium carbonate, trona, or alkaline fly ash can be added to the waste water. An alkaline reagent source 17 such as a container retaining such material can be connected to a waste water vessel 19 by one or more pipes or other feed conduits for feeding the alkaline reagent to the waste water while it is retained in the waste water vessel 19. In alternative embodiments, the alkaline reagent can be fed separately from the flue gas in a conduit prior to the flue gas entering the evaporator device 7, or into the evaporator device 7, or after the flue gas has exited an evaporator device (e.g. the alkaline reagent can be fed to the flue gas separate from the waste water and into bypass conduit 4 or output conduit 8 or evaporator device 7).

A pre-specified amount of alkaline reagent can be fed to the waste water so that waste water is alkaline rich and is in excess of what is required to precipitate insoluble and heavy metal compounds when the waste water is evaporated via contact with the flue gas in the evaporator 7. The presence of excess amounts of the alkaline reagent within the waste water can also help prevent corrosion and reduce pollutant emissions by capturing acid gas elements within the flue gas such as hydrogen chloride (HCl), hydrogen fluoride (HF), sulfur dioxide ($SO_2$), sulfur trioxide ($SO_3$), and sulfuric acid ($H_2SO_4$) and forming solid particulates such as calcium sulfite ($CaSO_3$), calcium sulfate ($CaSO_4$), calcium chloride ($CaCl_2$), and calcium fluoride ($CaF_2$). Additionally, any unreacted alkaline reagent within the solids can provide a sorbent that continues to react within the flue gas to continue to capture additional acid gas elements as the flue gas is passed out of the evaporator device 7 and fed to an outlet conduit 8, which feeds the cooled and humidified flue gas and solid particulates to the first flow of flue gas after that flow of flue gas has passed out of the pre-heater 5. The presence of such sorbent elements can help prevent corrosion of downstream equipment by capturing acidic elements within the flue gas and provide additional sorbent for downstream collection of acid gas related elements to prevent the emission of such elements into the atmosphere.

In embodiments where a wet flue gas desulfurization system 13 is located downstream of the evaporator device, the capture of HCl in the flue gas upstream due to the alkaline reagent can reduce the need to purge waste water. The size of the evaporator device 7 can therefore be reduced for those embodiments as there would be a need for a smaller amount of flue gas required to evaporate the smaller amount waste water.

In addition, activated carbon or activated coke can be added to the waste water vessel 19 to add activated carbon or activated coke to the liquid waste water prior to the waste water being fed to the evaporator device 7. The presence of the activated carbon or activated coke can result in the adsorption of compounds of metal such as mercury, selenium and arsenic and can suppress the potential to evaporate such compounds when the waste water is evaporated in the evaporator device 7. Additionally, the presence of the activated carbon or activated coke in the liquid waste water can result in the adsorption of metal compounds (e.g. mercury) that may be present in the flue gas passed through the evaporator device 7.

In some embodiments, the activated carbon or activated coke can be mixed with the alkaline reagent prior to feeding the material to the waste water vessel 19. In other embodiments, the activated coke or activated carbon can be kept separate from the alkaline reagent and can be separately added to the waste water.

The first portion of the flue gas and solid particulates from the output conduit 8 of the evaporator device 7 can be merged with the second portion of the flue gas output from the pre-heater 5 in a conduit or vessel prior to feeding the combined first and second portions of the flue gas and solid particulates to the particulate collector 9. The particulate collector 9 can be connected to the evaporator device 7 and pre-heater 5 via one or more conduits for receiving the merged flue gas and solid particulates. The particulate collector 9 can be configured as a precipitator such as an electrostatic precipitator, or a filter such as a fabric filter. The particulate collector 9 can alternatively be configured as another type of particulate collector that is configured to separate solid particulates from the flue gas and/or precipitate solid particulates out of the flue gas for separating those solids from the flue gas.

The separated flue gas can subsequently be fed to a wet flue gas desulfurization system 13 via at least one conduit connecting the particulate connector 9 to the wet flue gas desulfurization system for the removal of sulfur from the flue gas prior to the flue gas being transported to a stack 15 such as a chimney or heat recovery steam generator for expelling to the atmosphere. At least one conduit may connect the wet flue gas desulfurization system to the stack 15 for the transport of flue gas to the stack 15. In alternative embodiments, a dry flue gas desulfurization system can be utilized instead of a wet flue gas desulfurization system.

Waste water from the wet flue gas desulfurization system 13 can be fed to the waste water vessel 19 as a source of the waste water. For instance, waste water from a purge stream reaction tank, primary hydrocyclone overflow or vacuum filtrate can be fed to the waste water vessel 19 via one or more conduits interconnecting the waste water vessel 19 to the wet flue gas desulfurization system 13. Additionally, waste water from at least one other waste water source 21 can be fed to the waste water vessel 19. For instance, waste water from cooling tower blowdown, storm and coal pile run-off, chemical cleaning waste, and/or ash pond overflow of a power plant can be collected or otherwise transported to the waste water vessel 19 to be retained therein. It is also contemplated that a source of waste water can be from another industrial party that is a customer of the operator of the apparatus who transports waste water to the operator of the apparatus for treatment of the waste water.

The solid particulates from the particulate collector that is separated from the flue gas can include solid material produced during the original combustion of fossil fuel in the boiler unit 1 that can be entrained within the flue gas. Additionally, the solids formed from the waste water being contacted with the flue gas to cool and humidify the flue gas and precipitates of the flue gas that can be formed or otherwise extracted via the particulate collector 9, such as fly ash, can be separated from the flue gas via the particulate collector 9. The solid particulates separated by the particulate collector 9 can be transported for storage, treatment or other distribution via at least one solid particulate conduit 11.

Figure 2:
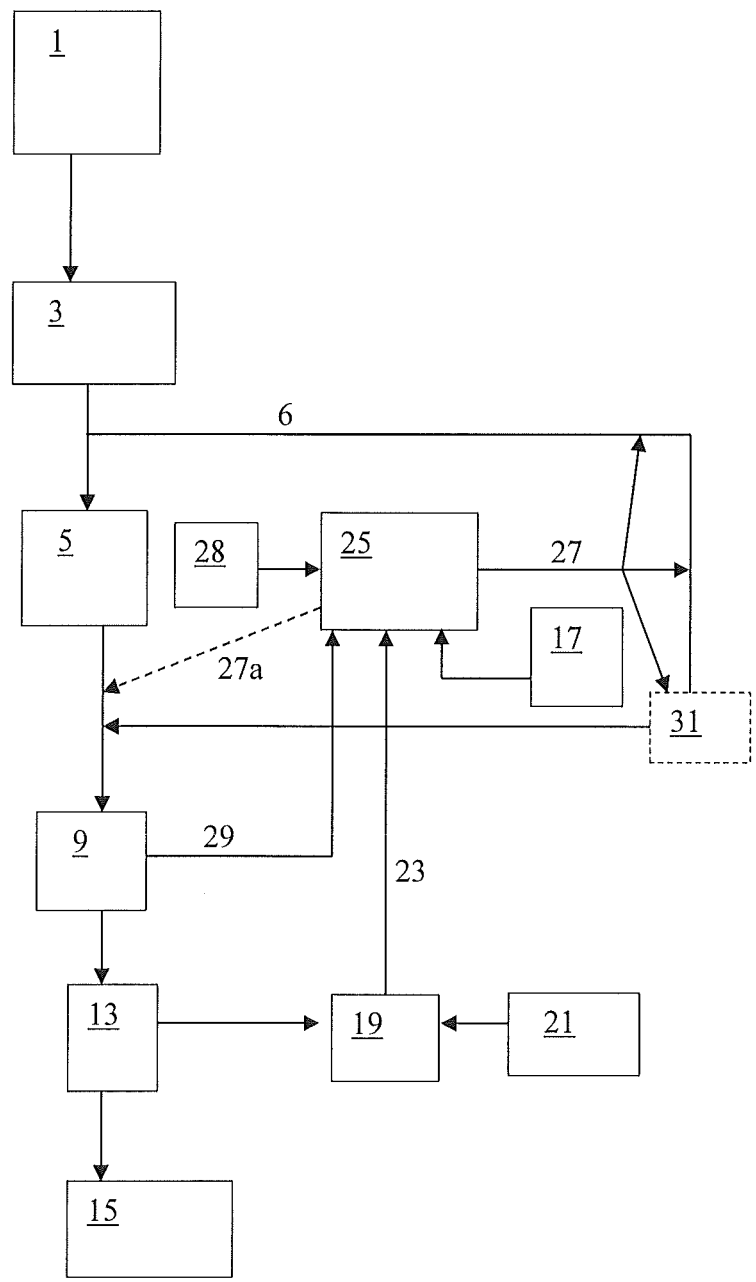
FIG. 2 is a block diagram of a second exemplary embodiment of an apparatus for evaporating waste water and reducing acid gas emissions.

In alternative embodiments, the waste water can be fed to a mixer device for mixing with an alkaline reagent, activated coke or activated carbon, and at least a portion of the solids separated by the particulate collector 9. FIG. 2 illustrates such an alternative embodiment.

As can be seen from FIG. 2, embodiments of the apparatus for evaporating waste water and reducing acid gas emissions can be configured so that a portion of flue gas emitted from a boiler unit 1 is fed to a bypass conduit 6 to bypass a pre-heater 5 after the flue gas has been passed through a nitrogen oxide removal unit 3 to remove nitrogen oxide components of the flue gas. Waste water from the wet flue gas desulfurization system 13 and at least one other waste water source 21 can be temporarily retained in a waste water vessel 19 such as a waste water holding tank prior to being fed through a conduit 23 to a mixer device 25 for mixing with an alkaline reagent fed to the mixer device 25 from an alkaline reagent source 17. For such embodiments, it is contemplated that the mixer device 25 can be configured as a mixer of a NID™ system that is provided by Alstom Power. Of course, other types of mixer devices can alternatively be used.

Conduits can connect the alkaline reagent source 17 and the waste water vessel 19 to the mixer device 25 for supplying these elements to the mixer device 25. An activated carbon source 28 or activated coke source can also be connected to the mixer device 25 via one or more conduits for feeding activated carbon or activated coke to the mixer device for mixing with the waste water. The mixer device 25 can also be connected to the particulate collector 9 by at least one solid particulate recycle conduit 29 so that at least a portion of the solid particulates separated by the particulate collector 9 can be fed to the mixer device 25. A portion of the solid particulate recycle conduit 29 can include one or more silos or vessels configured for temporary storage of solid particulates separated by the particulate collector 9 prior to the solid particulates being fed to the mixer device 25. In an alternative embodiment, solid particulates from the particulate collector 9 can be stored in a remote silo or solid particulate storage device that is connected to the solid particulate recycle conduit for recycling the solid particulates to the mixer device 25.

The mixer device 25 can receive the alkaline reagent, the solid material (e.g. solid particulates) from the particulate collector 9, the activated carbon or activated coke, and the liquid waste water. The mixer device 25 can agitate or otherwise mix these elements to combine the elements to form a mixture. The mixture formed by the mixer device 25 can be formed as a moist powder (e.g. a wet dust or moist dust) or a slurry. When formed as a moist powder, the mixture may have a water content of at least 1% water by weight or, more preferably, may have a content of between 2% and 5% water by weight. It is also contemplated that embodiments may be configured so that the mixer device forms a mixture having between 1% and 8% water by weight. In yet other embodiments, it is contemplated that the mixer device could be configured to form a moist powder having a water content that ranges from 1% water by weight to a content value that is over 8% water by weight.

The mixture formed via the mixer device 25 can subsequently be output from the mixer device. At least one mixture distribution conduit 27 can connect the mixer device 25 to the bypass conduit 6 to feed the mixture of the waste water, alkaline reagent, activated carbon or activated coke, and solid particulates to the flue gas passing through the bypass conduit. One or more nozzles or other dispersion mechanisms can be configured to disperse or spray the mixture within the bypass conduit 6 to feed the mixture to the flue gas. The mixture distribution conduit 27 can be configured so that the mixture formed by the mixer device 25 is dispersible within one discrete location of the bypass conduit 6 or is dispersible at multiple different spaced apart locations in the bypass conduit 6 to contact the flue gas passing through the bypass conduit 6. The flue gas and mixture can subsequently pass through the remaining portion of the bypass conduit and be subsequently merged with the flue gas passing out of the pre-heater 5. Alternative embodiments of the apparatus can be configured to allow any of the waste water streams or the alkali streams or the solid particulate from the particulate collector 9 to be added separately into the bypass conduit 6 or into an evaporator vessel 31.

The portion of the bypass conduit 6 through which both the flue gas and mixture pass can be considered a type of evaporator device as the flue gas is cooled and humidified as it is exposed to and directly contacts the waste water within the mixture and the solid particulates within the mixture are dried as they are exposed to and directly contact the hot flue gas.

It is contemplated that the bypass conduit 6 can include at least one evaporator vessel 31 (shown in broken line in FIG. 2) that is configured to receive the flue gas and the mixture from the mixer device 25 to retain these elements within the evaporator vessel 31 for a pre-specified residence time to ensure sufficient mixing of the mixture with the flue gas to ensure the waste water from the mixture is sufficiently evaporated, the solid particulates of the mixture are sufficiently dried, and the flue gas is sufficiently cooled and humidified to meet a particular set of design criteria. As such, the evaporator vessel 31 can be considered to be a type of evaporator device. The portion of the conduit through which the flue gas passes after being fed the mixture and prior to being fed to the particulate collector 9 (e.g. the evaporator vessel 31) can be a J-duct reactor or J-duct of an Alstom Power NID™ system, or other type of duct having at least one vertically extending section that provides a sufficient residence time for the flue gas and mixture to ensure the flue gas is cooled to a pre-specified temperature and the solid particulates are dried to a pre-specified degree of dryness as the flue gas and particulates move vertically through the duct to the particulate collector 9. The mixture from the mixer device 25 can be fed directly within the evaporator vessel 31 or can be fed to the bypass conduit 6 prior to the flue gas and mixture being passed through the evaporator vessel 31.

After the flue gas flow passing out of the pre-heater 5 is merged with the flue gas, evaporated waste water, and solid particulates from the bypass conduit 6, these combined materials can be fed to the particulate collector 9 for separating the solid particulates from the flue gas. The solid particulates can be separated such that at least a portion of the separated solid material is recycled to the mixer device via recycle conduit 29. Another portion of the solid material can be output for subsequent treatment and distribution.

The flue gas separated from the solid particulates can be passed from the particulate collector 9 to a wet flue gas desulfurization system 13 for subsequent processing prior to being emitted out of a stack 15 such as a heat steam recovery generator or chimney. Waste water from the wet flue gas desulfurization system 13 as well as waste water from other plant operations or waste water from another waste water source 21 can be fed to the waste water vessel 19 for retention and subsequent use in the mixer device 25. In alternative embodiments, a dry flue gas desulfurization system can be utilized instead of a wet flue gas desulfurization system.

It is contemplated that in addition to waste water from power plant or industrial plant operations, waste water from other industrial facilities can be conveyed via pipes, tubes or other conduits to the waste water vessel 19. In some embodiments, a power plant operator may therefore charge a service fee for processing of waste water from industrial customers or other third parties that have need for waste water removal in addition to utilizing its own waste water in operations of the apparatus for evaporating waste water and reducing acid gas emissions.

In some embodiments, it is contemplated that the mixture formed in the mixer device 25 is passable to the flue gas after the flue gas has passed through the pre-heater 5 via at least one mixture feed conduit 27a (shown in broken line in FIG. 2) such that the flue gas can be cooled and humidified and the solid particulates within the mixture can be dried within a conduit or vessel transporting the flue gas to the particulate collector 9 downstream of the pre-heater 5 (e.g. after the flue gas has passed through the pre-heater 5) and prior to the flue gas, evaporated waste water, and solid particulates being passed through the particulate collector 9. Such an embodiment of the apparatus can be advantageous as it may provide a relatively small footprint that permits a power plant or industrial plant to be retrofitted with the apparatus with minimal capital costs being incurred.

For instance, bypass conduit 6 may not be needed for embodiments of the apparatus that are configured so that the mixture formed by the mixer device 25 is fed to all the flue gas after it has exited the pre-heater 5 and before it has been fed to the particulate collector 9 via at least one mixture feed conduit 27a. Further, it is contemplated that a pre-existing conduit within a power plant or industrial plant that transports flue gas from a pre-heater to a particulate collector can be utilized with minimal modification for the transport of the mixture and flue gas to the particulate collector 9. The portion of this conduit that transports both the mixture and the flue gas can be configured so that the mixture has a sufficient residence time with the flue gas passing through that conduit to ensure the flue gas is sufficiently cooled and the solid particulates within the mixture are sufficiently dried prior to entering the particulate collector 9. For example, the flue gas can be at a temperature of between 250° F. and 400° F., or between 120° C. and 205° C. after passing out of the pre-heater 5 and be subsequently further cooled upon contacting the mixture from the mixer device 25 to a temperature of between 180° F. and 300° F. or between 80° C. and 150° C. so that the solid particulates are sufficiently dried and the flue gas is cooled and humidified prior to being fed to the particulate collector 9.

In some embodiments of the apparatus, it is contemplated that multiple different mixture feed conduits can be utilized for feeding the mixture from the mixer device 25 to the flue gas at multiple different spaced apart locations within the apparatus or power plant. For example, a portion of the mixture could be fed to the flue gas via a mixture feed conduit prior to the flue gas being passed through the pre-heater 5 and another portion of the mixture could be fed to the flue gas after the flue gas is passed through the pre-heater 5.

The flow rate, temperature, and/or humidity of the flue gas within the bypass conduit 6 or within another conduit feeding the flue gas to the particulate collector 9 can be monitored via at least one flow sensor, at least one temperature sensor, and/or at least one humidity sensor to control operations of the mixer device 25 to ensure that the flue gas is cooled to at least a pre-specified temperature and has a pre-specified humidity level. For example, the flow rate of waste water fed to the mixer device 25 or the amount of water mixed within the mixture fed to the flue gas can be adjusted based upon the temperature and/or humidity level detected by the one or more sensors to maintain the flue gas within the bypass conduit 6 or within the conduit feeding the flue gas to the particulate collector 9 at a pre-specified temperature range such as at a temperature of between 200° F. and 300° F., at a temperature of between 90° C. and 150° C. or at a temperature that is at least 10° C. or 30° F. above its adiabatic saturation temperature to avoid wetting of the solid particulates and/or corrosion.

Embodiments of the apparatus for evaporating waste water to reduce acid gas can be configured to avoid capital and operating costs associated with conventional waste water treatment, reduce or eliminate permitting and reporting of waste water discharge, reduce capital and operating costs associated with compliance with air emission regulations, and improve particulate collection by cooling and humidifying flue gas upstream of a particulate collector, reduce reagent consumption as compared to dry sorbent injection systems. Embodiments of the apparatus can also avoid corrosion throughout different elements of a plant by the addition of an alkaline reagent such as lime, slaked lime, sodium bicarbonate, or trona. It is contemplated that embodiments of the apparatus can also reduce power consumption of a plant due to lower gas volumes creating lower pressure drops and reducing a need for fan power (or pump power) due to the lower gas volumes that can be generated by the cooling of the flue gas provided by the evaporation of the waste water. For instance, the operation of the particulate collector 9 can be at lower volumes due to the decrease in temperature, which can provide an operational cost savings for plant operations.

It should be appreciated that various changes can be made to embodiments of the apparatus for evaporating waste water and reducing acid gas emissions to account for different design criteria. For instance, the size, shape or configuration of conduits for transporting different fluids to and from different elements of the apparatus can be any of a number of suitable shapes, sizes, or configurations and include any of a number of different conduit elements such as vessels, valves, pipes, tubes, tanks, or ducts that have the flow rate of fluid affected by pumps or fans connected to or in fluid communication with such elements. The temperatures and/or pressures at which the flue gas, waste water, and other fluid flows are to be maintained at or kept can also be any of a number of suitable ranges to meet a particular set of design objectives. As another example, any type of suitable alkaline reagent can be injected within or mixed with the waste water to neutralize acid gases absorbed by the waste water in the evaporator device. As yet another example, the waste water vessel 19 can be a holding tank, a retention tank, or any other type of vessel that is configured so that waste water for use in the evaporator device 7 and/or mixing device 25 is collectable and/or transportable to the evaporator device 7 or mixing device 25. As yet another example, the apparatus or method can be configured so that a wet or dry flue gas desulfurization system is not utilized. For instance, hot flue gas from a boiler can be fed to the evaporator device 7 or mixing device 25 without that flue gas ever being passed through or otherwise processed by a desulfurization system. Additionally, some embodiments of the apparatus can be configured so that no nitrogen oxide removing unit 3 is necessary.

While the invention has been described with reference to various exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for evaporating waste water and reducing acid gas emissions, comprising:
    adding an alkaline reagent to a waste water to produce alkaline waste water;
    transporting a first portion of a flue gas emitted by a combustion unit to an evaporator device such that the first portion of the flue gas bypasses a pre-heater and is contacted by the alkaline waste water to evaporate the alkaline waste water, to reduce acid gas emissions, to produce a cooled and humidified first portion of the flue gas, and to produce dry solid particulates;
    separating the dry solid particulates using a particulate collector to obtain separated dry particulates;
    feeding a portion of the separated dry particulates to the waste water prior to alkaline waste water contact with the first portion of the flue gas;
    transporting a second portion of the flue gas emitted by the combustion unit to the pre-heater to heat a fluid in the preheater to produce a heated fluid supplied to the combustion unit; and
    merging the cooled and humidified first portion of the flue gas with the second portion of the flue gas, after the second portion of the flue gas has passed through the pre-heater, to produce a merged flue gas.

2. The method of claim 1, wherein the alkaline reagent, at least a portion of the separated dry particulates and the waste water are mixed to form a mixture supplied to the first portion of the flue gas for contact to cool and humidify the first portion of the flue gas and to capture acid gas elements within the merged flue gas after the second portion of the flue gas exits the pre-heater and prior to merged flue gas flow into the particulate collector.

3. The method of claim 1, wherein the alkaline reagent, at least a portion of the separated dry particulates and the waste water are mixed to form a moist powder mixture supplied to the first portion of the flue gas for contact to cool and humidify the first portion of the flue gas and to capture acid gas.

4. The method of claim 1, further comprising:
    using a waste water vessel configured to receive waste water from at least one waste water source and configured to receive the alkaline reagent from an alkaline reagent supply to produce alkaline waste water within the waste water vessel for supply to the evaporator device.

5. The method of claim 1, further comprising:
    using the combustion unit connected to the evaporator device for supply of at least the first portion of the flue gas to the evaporator device;
    using the particulate collector connected to the evaporator device to receive at least the cooled and humidified first portion of the flue gas for separation of dry solid particulates from the cooled and humidified first portion of flue gas supplied by the evaporator device.

6. The method of claim 1, further comprising:
    using the particulate collector to supply merged flue gas to a flue gas desulfurization system connected to the particulate collector, for flue gas desulfurization system removal of sulfur oxides from the merged flue gas, with waste water produced in the flue gas desulfurization system supplied to a waste water vessel.

7. The method of claim 1, further comprising:
    using a mixer device configured for mixing the alkaline reagent, the waste water, and at least a portion of the separated dry particulates to form a mixture supplied to the evaporator device.

8. The method of claim 1, further comprising:
    using a conduit of the evaporator device for supply of the cooled and humidified first portion of the flue gas to the particulate collector, with a mixture of the alkaline reagent, the waste water, and at least a portion of the separated dry particulates mixed in a mixer device and supplied to the conduit for contact with the cooled and humidified first portion of the flue gas flowing through the conduit for supply to the particulate collector.

9. The method of claim 1, further comprising:
    using the evaporator device comprising a vessel for receiving the first portion of the flue gas and a mixture of the alkaline reagent, the waste water, and at least a portion of the separated dry particulates, for retention in the vessel of the first portion of the flue gas and the mixture for a pre-specified time period to cool and humidify the first portion of the flue gas and to dry the mixture prior to supply to the particulate collector.

10. The method of claim 1, further comprising:
    monitoring one or more conduits supplying flue gas to the particulate collector using at least one sensor selected from a group of sensors consisting of a flow sensor, a temperature sensor, and a humidity sensor.

11. The method of claim 1, further comprising:
    monitoring one or more conduits supplying flue gas to the particulate collector using one or more temperature sensors to control operations for flue gas cooling to at least a pre-specified temperature.

12. The method of claim 1, further comprising:
    monitoring one or more conduits supplying flue gas to the particulate collector using one or more humidity sensors to control operations for humidifying flue gas to at least a pre-specified humidity level.

13. The method of claim 1, further comprising:
    monitoring one or more conduits supplying flue gas to the particulate collector using one or more flow sensors to control operations for waste water evaporation and acid gas emissions reduction.

14. The method of claim 1, further comprising:
    controlling a mixing device based on monitoring one or more conduits supplying flue gas to the particulate collector, using at least one sensor selected from a group of sensors consisting of a flow sensor, a temperature sensor, and a humidity sensor, for the monitoring.

* * * * *